United States Patent Office 3,211,701
Patented Oct. 12, 1965

3,211,701
POLYURETHANE CASTING PROCESS
Erwin Müller and Arthur Reischl, Leverkusen, and Konrad Ellegast, Leichlingen, Germany, assignors to Farbenfabriken Bayer Aktiengesellschaft, Leverkusen, Germany, a German corporation
No Drawing. Filed May 24, 1961, Ser. No. 112,204
Claims priority, application Germany, May 31, 1960,
F 31,341
2 Claims. (Cl. 260—75)

This invention relates to polyurethane plastics and more particularly, to polyurethane castings which are substantially nonporous and which have improved physical properties particularly after extended storage.

The preparation of nonporous polyurethane plastics by a casting technique wherein an organic diisocyanate is reacted first with an hydroxyl polyester obtained from a dicarboxylic acid and a dihydric alcohol, said polyester having a molecular weight greater than 1000, to prepare an —NCO terminated product in a first step which is then combined in a second step with an organic cross-linking agent and cast in a mold is well known. The polyesters usually have a molecular weight for commercial practice between about 2000 and about 3000. The resulting polyurethane castings are substantially nonporous provided that the reaction is carried out under substantially anhydrous conditions and have very good physical properties including tensile strength, elongation, load bearing and the like. The castings, however, are not always stable with respect to acids and caustic solutions because of the hydrophilic properties of the polyester and their tendency to become saponified. They are especially sensitive to moisture above about 70° C. Their resistance to hydrolysis can be improved if polyesters based on carboxylic acids and glycols which have more than five carbon atoms are used, for example, a polyester of this type is disclosed in U.S. Patent 2,729,618. But when the polyesters are prepared from acids and glycols which have more than five carbon atoms, the polyester has an increased tendency to crystallize which is the more aggravated by the high melting point of the polyester. Consequently, this tendency toward crystallization is retained in the polyester chains that occur in the first elastomer and leads to hardening of the polyurethane plastic at room temperature. Still further, these castings show a high permanent elongation and a low resistance to cold so that the useful application of the elastomers must avoid places where these properties are important.

It is, therefore, an object of this invention to provide polyurethane castings which are substantially devoid of the foregoing disadvantages. Another object of this invention is to provide improved polyurethane castings which are based on hydroxyl polyesters prepared from dicarboxylic acids and dihydric alcohols each of which have more than five carbon atoms. Another object of this invention is to provide improved polyhydroxyl compounds for the preparation of substantially nonporous polyurethane castings. Still a further object of this invention is to provide an improved process for the preparation of polyurethane castings based on hydroxyl polyesters all of whose components contain more than five carbon atoms.

The foregoing objects and others which will become apparent from the following description are accomplished in accordance with the invention, generally speaking, by providing polyurethane castings which are obtained by a process wherein an hydroxyl polyester prepared by a process which comprises condensing a dicarboxylic acid having at least five carbon atoms with a dihydric alcohol having at least five carbon atoms, the resulting polyester having a molecular weight of from about 900 to about 1200, is reacted with from about 0.4 to about 0.7 mol of an organic diisocyanate per mol of said hydroxyl polyester in a first step to prepare an hydroxyl terminated polyester urethane. The resulting hydroxyl terminated polyester urethane is reacted in a second step with an excess of an organic diisocyanate to obtain an —NCO terminated interpolymer which is then reacted with an organic cross-linking agent to obtain a mixture which can be cast in a mold to provide a substantially nonporous polyurethane plastic. It is preferred to carry out the reaction under substantially anhydrous conditions throughout. Moreover, it is preferred to only react sufficient organic diisocyanate with the hydroxyl polyester so that the polyester urethane has a molecular weight of from about 2000 to about 3000. By following the procedure of this invention, the above-described tendency toward crystallization, poor resistance to cold and poor permanent elongation can be avoided.

A synergistic effect is obtained by this new process. The hydroxyl polyesters with a molecular weight of about 900 to about 1200 and synthesized from glycols and dicarboxylic acids, each with at least five carbon atoms, are already hydrophobic. The reaction with about 0.4 to about 0.7 mol of an organic diisocyanate per mol of polyester then proceeds with a chain lengthening effect and yields a polyester urethane with a molecular weight of about 2000 to about 3000. This produces not only an even greater hydrophobic or water-repellent effect but simultaneously causes a reduction in the tendency toward crystallization of the polyester chains. The incorporated diisocyanate thus acts on the hydroxyl polyester to disrupt the polymer and cause a lowering of the melting point. If such polyester urethanes are then reacted with an excess of an organic diisocyanate to produce an isocyanato terminated prepolymer which is then mixed with an organic cross-linking agent and is cast in molds, a substantially nonporous elastomer is obtained which is not only extremely resistant to hydrolysis but also shows a reduced tendency to crystallization of the polyester chains so that the elasticity of the polyurethane is retained at low temperatures.

The hydroxyl polyesters having a molecular weight of from about 900 to about 1200 may be prepared by the esterification of any suitable dicarboxylic acid with any suitable dihydric alcohol provided that each contains at least five carbon atoms. The preferred dicarboxylic acids and dihydric alcohols have from five to eighteen carbon atoms. Any suitable dicarboxylic acid having at least five carbon atoms may be used such as, for example, adipic acid, isosebacic acid, azelaic acid, hendecanedioic acid, dodecandioic acid and the like. The aliphatic acids are preferred. Any suitable dihydric alcohol having at least five carbon atoms may be used such as, for example, 1,5-pentane diol, hexane-1,6-diol, 2-dimethyl propane-1,3-diol, hexane-2,5-diol, 1,18-octadecane diol and the like, preferably having from five to eighteen carbon atoms. Of course, mixtures of the different dihydric alcohols and dicarboxylic acids may be used in some cases with a further reduction in the tendency toward crystallization. A particularly preferred mixture is one based on adipic acid, hexane-1,6-diol and 2,2-dimethyl propane-1,3-diol.

In accordance with a preferred embodiment of the invention the hydroxyl polyester of the invention having a molecular weight of from about 900 to about 1200 is reacted with from about 0.4 to about 0.7 mol of the organic diisocyanate at a temperature of from about 80° C. to about 150° C. until there are no longer any free —NCO groups present in the reaction mixture. While any suitable organic diisocyanate may be used for this reaction, diphenylmethane-4,4'-diisocyanate, hexamethylene diisocyanate, hexahydro-p-phenylene diisocyanate, toluylene-2,4-diisocyanate and mixtures of the 2,4- and 2,6-isomers of toluylene diisocyanate preferably an 80:20 mixture are preferred. Moreover, it is preferred to carry out this initial reaction to prepare a polyhydroxyl compound suitable for further modification to form a polyurethane elastomer at a temperature between about 100° C. and about 130° C. Anhydrous conditions should be maintained throughout and particularly good results are obtained where vacuum is applied to the reaction mixture in order to remove any moisture both before the polyester is mixed with the organic diisocyanate and in order to completely degas the reaction mixture during the reaction.

The hydroxyl polyester urethane obtained in the first stage is then reacted with an organic diisocyanate to prepare an isocyanato modified prepolymer which may be mixed with an organic cross-linking agent to prepare an improved polyurethane casting. It is preferred to use an excess of about 20 to about 300 mol percent of the organic diisocyanate based on the free hydroxyl groups of the polyester. While any suitable organic diisocyanate may be used for this modification naphthylene-1,5-diisocyanate, p-phenylene diisocyanate and diphenylmethane-4,4'-diisocyanate are particularly preferred.

The isocyanato terminated prepolymer obtained in the second step is then mixed with an organic cross-linking agent and the mixture is cast in a mold. The proportion of the cross-linking agent based on the free —NCO groups of the isocyanato terminated prepolymer is preferably less than enough to react with all of the —NCO groups. Generally speaking, it is preferred to use from about 90 percent to about 99 percent of the theoretical amount of a cross-linking agent necessary to react with all of the free —NCO groups remaining in the reaction mixture. In other words, somewhat less than a stoichiometric amount of the organic cross-linking agent is used.

Any suitable organic cross-linking agent may be used in this step including polyhydric alcohols and polyamines. Suitable polyamines are, for example, 3,3'-dichlorobenzidine, 3,3'-dichloro-4,4'-diaminodiphenylmethane, 2,5-dichlorophenylene-1,4-diamine and the like. It is preferred, however, to use a polyhydric alcohol such as butane-1,4-diol, hexane-1,6-diol, 1,5-naphthylene-β-dihydroxy ethyl ether, hydroquinone-β-hydroxy ethyl ether, trimethylol propane, glycerine, 1,2,6-hexanetriol and the like.

The final cross-linking reaction can be carried out under either acid or alkaline conditions, these compounds accelerating or retarding the reactivity of the isocyanates, respectively. Acidic retarding agents are, for example, hydrochloric acid, acid chlorides such as benzoyl chloride and also sulphur dioxide, boric acid esters such as the ethyl ester of boric acid and acid fillers such as carbon black and the like. Examples of accelerators are tertiary amines such as N-ethyl morpholine, dimethyl benzyl amine, methyl diethanolamine, triethylene diamine and the like. Moreover, one may include in the reaction mixture water-repelling agents for example, paraffins, silicone oils and the like which may also contain functional groups capable of reaction with isocyanates so that they become chemically combined to the molecule as well as phenol or its soluble formaldehyde condensation products.

It is preferred to cure the casting at at least about 50° C. until a solid substantially nonporous polyurethane plastic is obtained which can be removed from the mold. Subsequent to removing the casting from the mold it is preferred to further cure the polyurethane casting at a temperature of at least about 100° C. for at least about 24 hours.

The present process is especially suitable for the production of plastics having a high degree of hardness and elasticity, and as can be inferred from the comparisons in the following examples, the good resistance to hydrolysis is also to be mentioned. The products obtained by the process are especially suitable for many purposes in which hitherto other synthetic and natural types of rubber were employed, for example, as plates, pipes, cylinders, annular liners for ball mills, resilient machine components, mats, shoe heels, rubber plugs, packings, handles and the like.

The invention is further illustrated by the following examples in which the parts are by weight unless otherwise indicated.

*Example 1*

Production of the starting material:

About 5 kilograms of a polyester with an —OH number of about 119 and an acid number of about 1, prepared from about 4.6 kilograms of hexane-1,6-diol and about 4.3 kilograms of adipic acid, are reacted with about 485 grams of a mixture of 80 percent 2,4- and 20 percent 2,6-toluylene diisocyanate. A polyester urethane with a softening point from 38° C. to about 40° C. is obtained.

About 200 grams of this polyester urethane (—OH number about 58) are dehydrated at about 130° C./12 mm. Hg after adding about 3 drops of concentrated hydrochloric acid. After about 37 grams of naphthylene-1,5-diisocyanate have been incorpated by stirring the mixture is heated for about 20 minutes at about 130° C. to about 140° C., about 4 grams of 1,4-butanediol are then introduced and the mixture is poured into a prepared mold. After further heating for about 24 hours at about 100° C., an elastomer which has the following properties is obtained:

Tensile strength, DIN 53504 _____kg./cm.$^2$__ 227
Breaking elongation, DIN 53504 _____percent__ 465
Resistance to further tearing (according to Craves),
  DIN 53515 _____kg./cm__ 24
Shore hardness, DIN 53505 _____ 85
Tensile strength at 300% elongation, DIN
  53504 _____kg./cm.$^2$__ 108
Impact elasticity, DIN 53512_____percent__ 42
Permanent elongation, DIN 53504_____do____ 12

After aging for about 14 days at about 17° C. and about 95 percent relative air humidity, the tensile strength is about 173 kg./cm.$^2$, the breaking elongation is 465 percent and the tensile strength at 300 percent elongation is 96 kg./cm.$^2$.

On the other hand, if the polyester urethane which has been described is replaced under otherwise the same condition by a conventional ethylene glycol-adipic acid polyester (—OH number about 58) as polyhydroxyl compound, an elastomer is obtained which has the following properties:

Tensile strength, DIN 53504 _____kg./cm.$^2$__ 295
Breaking elongation, DIN 53504 _____percent__ 610
Resistance to further tearing (according to Craves),
  DIN 53513 _____kg./cm__ 24
Shore hardness, DIN 53505 _____ 85
Tensile strength at 300% elongation, DIN
  53504 _____km./cm.$^2$__ 84
Impact elasticity, DIN 53512 _____ percent__ 53
Permanent elongation, DIN 53504 _____do____ 9

After aging for about 14 days at about 70° C. and about 95 percent relative humidity, the tensile strength has fallen to 48 kg./cm.$^2$, the breaking elongation has fallen to 345 percent and the impact elasticity to 43 percent.

*Example 2*

About 200 grams of the polyester urethane (—OH number about 58) described in Example 1 are dehydrated at about 130° C./12 mm. Hg. after adding about 5 drops of concentrated hydrochloric acid. After incorporating about 60 grams of naphthylene-1,5-diisocyanate by stirring, the mixture is heated for about 20 minutes to about 130° C. to about 140° C., then about 14.3 grams of butane-1,4-diol are added and the mixture is poured into prepared molds. After heating for about another 24 hours at about 100° C. an elastomer having the following properties is obtained:

Tensile strength, DIN 53504 _____kg./cm.² __ 222
Breaking elongation, DIN 53504 _____percent__ 390
Resistance to further tearing (according to Craves),
  DIN 53515 _____kg./cm.__ 50
Shore hardness, DIN 53505 _____ 90
Tensile strength at 300% elongation, DIN
  53504 _____kg./cm.² __ 181
Impact elasticity, DIN 53512 _____percent__ 43
Permanent elongation, DIN 53504 _____do____ 31

After aging for about 14 days at about 70° C. and about 95 percent relative humidity, the tensile strength is 223 kg./cm.², the breaking elongation is 390 percent and the tensile strength at 300 percent elongation is 173 kg./cm.².

On the other hand, if a conventional glycol-adipic acid polyester (—OH number about 58) is used as polyhydroxyl compound instead of the polyester urethane as described, under otherwise the same conditions, an elastomer with the following properties is obtained:

Tensile strength, DIN 53504 _____kg./cm.² __ 245
Breaking elongation, DIN 53504 _____percent___ 495
Resistance to further tearing (according to Craves),
  DIN 53515 _____kg./cm__ 32
Shore hardness, DIN 53505 _____ 94
Tensile strength at 300% elongation, DIN
  53504 _____kg./cm.² __ 171
Impact elasticity, DIN 53512 _____percent__ 52
Permanent elongation, DIN 53504 _____do____ 34

After aging for about 14 days at about 70° C. and about 95 percent relative air humidity, the tensile strength has fallen to 108 kg./cm.² and the breaking elongation to 280 percent.

*Example 3*

5 kg. of a polyester with an OH-number of 120 and an acid number of 1.5 prepared from 3.42 kg. of hexane-1,6-diol, 1.18 kg. of 2-dimethyl-1,3-pentane diol and 4.3 kg. of adipic acid are reacted with 486 g. of toluylene diisocyanate (80:20 mixture). A liquid polyesterurethane with an OH number of 56 is obtained.

200 g. of this polyesterurethane are dihydrated at 130° C./12 mm. Hg and then reacted with 36 g. of 1.5-naphthylene diisocyanate. The mixture is heated from 20 minutes at 130° C. 4 g. of 1.4-butane diol are then introduced and the mixture is poured into prepared molds. After further heating for 24 hours at 100° C. an elastomer is obtained which exhibits a good resistance against hydrolytic influences and a remarkable cold resistance.

It is to be understood that the foregoing examples are given for the purpose of illustration and that any other suitable organic diisocyanate, hydroxyl polyester, organic cross-linking agent and the like could have been used provided that the teachings of the disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of a polyurethane casting which comprises reacting an hydroxyl polyester obtained from a dicarboxylic acid having at least five carbon atoms and a dihydric alcohol having at least five carbon atoms as essentially the sole components of said hydroxyl polyester, said hydroxyl polyester having a molecular weight of from about 900 to about 1200, with from about 0.4 to about 0.7 mol of an organic diisocyanate per mol of said hydroxyl polyester at a temperature of from about 80° C. to about 150° C. until there are no longer free —NCO groups present in the reaction mixture and an hydroxyl terminated polyester urethane is obtained which has a molecular weight of from 2000 to about 3000 and then reacting the resulting hydroxyl terminated polyester urethane in a second step with an excess of from about 20 to about 300 mol percent an organic diisocyanate based on the free hydroxyl groups of said hydroxyl terminated polyester urethane to obtain an —NCO terminated interpolymer, mixing said —NCO terminated interpolymer with an organic cross-linking agent selected from the group consisting of a polyhydric alcohol and a polyamine required to react with all of the —NCO group of said —NCO terminated interpolymer, casting the resulting mixture in a mold and allowing it to cure at a temperature of at least about 50° C. until a solid substantially non-porous polyurethane plastic is obtained.

2. The process of claim 1 wherein said process is carried out under substantially anhydrous conditions throughout.

References Cited by the Examiner

UNITED STATES PATENTS

| | | | |
|---|---|---|---|
| 2,621,166 | 12/52 | Schmidt et al. | 260—75 |
| 2,625,532 | 1/53 | Seeger | 260—75 |
| 2,912,408 | 11/59 | Nischk et al. | 260—75 |
| 2,929,800 | 3/60 | Hill | 260—75 |

FOREIGN PATENTS

| | | |
|---|---|---|
| 1,059,658 | 7/59 | Germany. |
| 880,556 | 10/61 | Great Britain. |

LEON J. BERCOVITZ, *Primary Examiner.*

HAROLD N. BURSTEIN, DONALD E. CZAJA,
  *Examiners.*